United States Patent [19]
Lopez, Sr.

[11] Patent Number: 6,059,080
[45] Date of Patent: May 9, 2000

[54] WIRE WHEEL WITH CONTINUOUS ELECTRICAL CONNECTION

[76] Inventor: Enrique Lopez, Sr., 601 Del Norte Blvd. #0, Oxnard, Calif. 93030

[21] Appl. No.: 09/078,216

[22] Filed: May 13, 1998

[51] Int. Cl.[7] ................................................... H02G 11/00
[52] U.S. Cl. ................................. 191/12 R; 191/12.2 R; 191/12.4
[58] Field of Search ........................... 191/12 R, 12.2 R, 191/12.4

[56] References Cited

U.S. PATENT DOCUMENTS

| | | | |
|---|---|---|---|
| 4,284,180 | 8/1981 | Masters | 191/12.2 R |
| 5,101,082 | 3/1992 | Simmons et al. | 191/12.2 R |
| 5,733,141 | 3/1998 | Penrod | 191/12.2 R |

*Primary Examiner*—Jesus D. Sotelo
*Assistant Examiner*—Robert J. McCarry, Jr.

*Attorney, Agent, or Firm*—Goldstein & Canino

[57] ABSTRACT

A wire reel, for attaching to a fixed power source and providing power to a remote location, comprising a spool and a hub plate. The hub plate is mounted to a stationary mounting near the fixed power source. A fixed power cord is attached between the fixed power source and the hub plate. A quantity of extension cord is wound around the spool. A slip ring assembly is mounted within the spool, the slip ring assembly provides a continuous electrical connection between the fixed power cord and the extension cord. The slip ring assembly allows the spool to rotate around the hub plate while maintaining the electrical connection between the fixed power cord and the extension cord so that the extension cord can be let out or reeled in without the need to physically disconnect the fixed power cord from the fixed power source. A metallic main shaft assembly provides an axis of rotation for the spool and can provide a ground connection between the extension cord and fixed power cord.

1 Claim, 5 Drawing Sheets

WIRE WHEEL WITH CONTINUOUS ELECTRICAL CONNECTION

BACKGROUND OF THE INVENTION

The invention relates to a wire reel. More particularly, the invention relates to a wire reel which holds a length of cable and is capable of letting out or taking up cable while the cable maintains an electrical connection between a fixed power source and the cable remote end.

Many tasks that require electrical power must be performed a considerable distance from a power source. Thus, extension cords are available in considerable lengths, to bridge the gap between the power source and the location where power is needed. However, when not in use, the extension cord is difficult to neatly bundle, and easily tangles.

To combat the storage and tangling problems, wire reels have recently become popular. Wire reels allow a large quantity of an extension cord to be stored, and then conveniently unreeled prior to use. After use, storage simply involves reeling up the previously dispensed cord.

The main problem with using wire reels, is that any reeling and unreeling of the cord must take place when the reel end of the cord is unplugged from the power source. This is because when the hub rotates to reel and unreel the cord, the reel end of the cord becomes twisted. If the cord is repeatedly twisted and untwisted, the wires within will break, causing a failed cable or even a fire.

Unfortunately, while performing many tasks with power tools the user suddenly requires "more cord". With present wire reels, the user must either unplug the reel end to let out the cord, or someone else must be present at the reel to do so.

While these units may be suitable for the particular purpose employed, or for general use, they would not be as suitable for the purposes of the present invention as disclosed hereafter.

SUMMARY OF THE INVENTION

It is an object of the invention to produce a wire reel which contains a quantity of multiple connector wire having a reel end which is connected to a fixed power source and an extension cord remote end which brings power to a location remote from the wire reel. The wire reel is rotatable to unreel cord, but need not be disconnected at the fixed power source in order to rotate the wire reel.

It is another object of the invention to provide a wire reel which maintains a continuous electrical connection as the reel is rotated. Accordingly, a slip ring assembly is provided which allows the reel and hub plate to easily rotate with respect to each other, while maintaining an electrical connection therebetween. A metallic main shaft assembly provides a ground connection between the remote and fixed ends.

It is a further object of the invention to provide a wire reel which is constructed for reliability and long term performance. Accordingly, the concentric ring arrangement of the slip ring assembly assures that a reliable electrical connection will be maintained even after considerable use.

The invention is a wire reel, for attaching to a fixed power source and providing power to a remote location, comprising a spool and a hub plate. The hub plate is mounted to a stationary mounting near the fixed power source. A fixed power cord is attached between the fixed power source and the hub plate. A quantity of extension cord is wound around the spool. A slip ring assembly is mounted within the spool, the slip ring assembly provides a continuous electrical connection between the fixed power cord and the extension cord. The slip ring assembly allows the spool to rotate around the hub plate while maintaining the electrical connection between the fixed power cord and the extension cord so that the extension cord can be let out or reeled in without the need to physically disconnect the fixed power cord from the fixed power source. A metallic main shaft assembly provides an axis of rotation for the spool and can provide a ground connection between the extension cord and fixed power cord.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
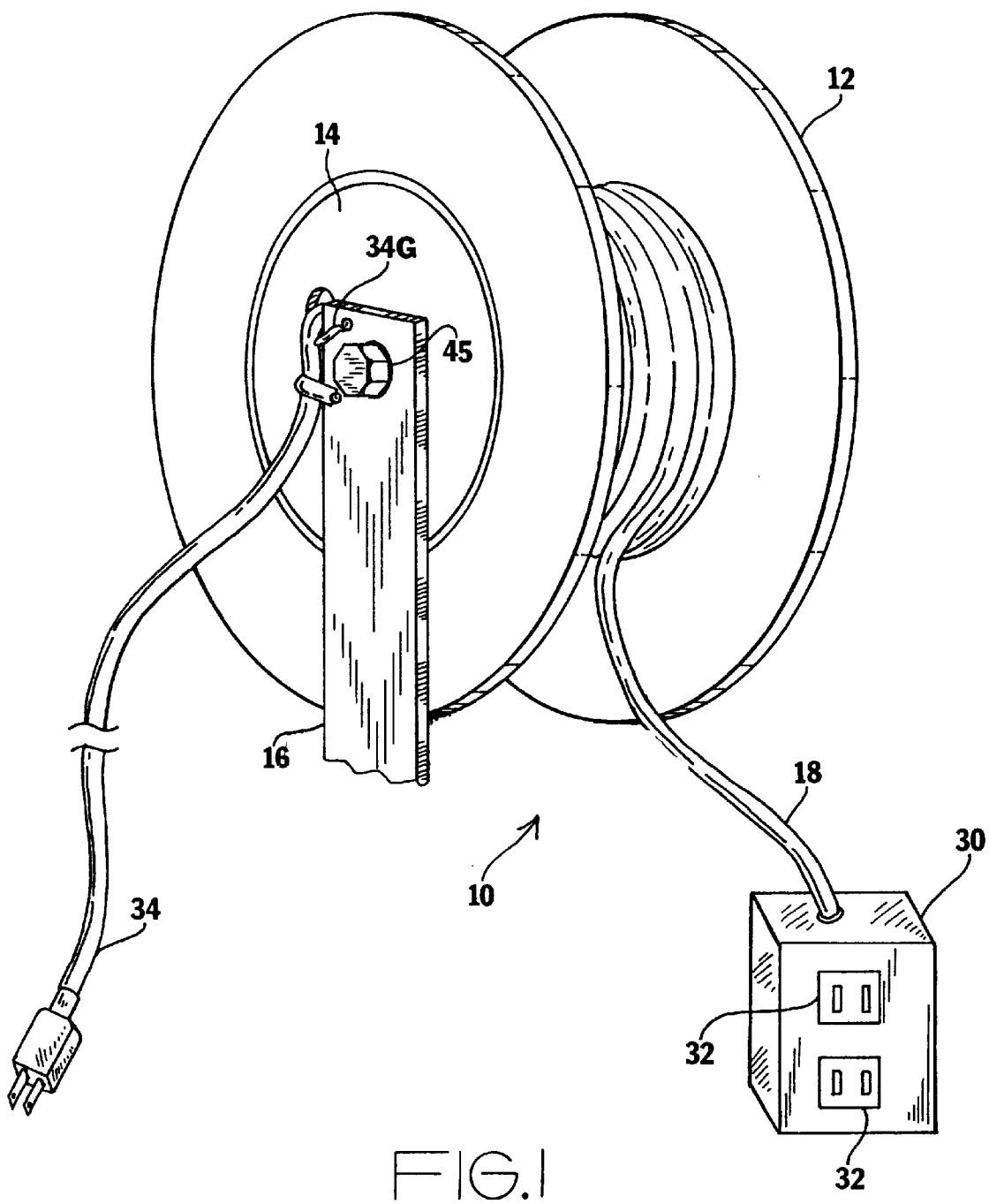
FIG. 1 is a diagrammatic perspective view, illustrating the invention, per se.

FIG. 1 illustrates a wire reel 10, comprising a spool 12 and a hub plate 14. The hub plate 14 is fixed to a stationary mounting 16 wherein a fixed power source is located. The spool 12 rotates freely upon the hub plate 14.

An extension cord 18 is wound upon the spool 12. The extension cord has a remote end 30, which generally contains one or more standard female connectors 32. The wire reel comprises a fixed cord 34 which is attached between the hub 14 and the fixed power source. The fixed cord 34 has a male connector 32 for attaching into the fixed power source. According to the present invention, the remote end 30 can be carried a considerable distance from the spool 12, the spool unwinding to let out more of the extension cord 18, while the fixed cord 34 remains physically connected to the fixed power source. The manner in which this is accomplished will be described hereinafter.

Figure 2:
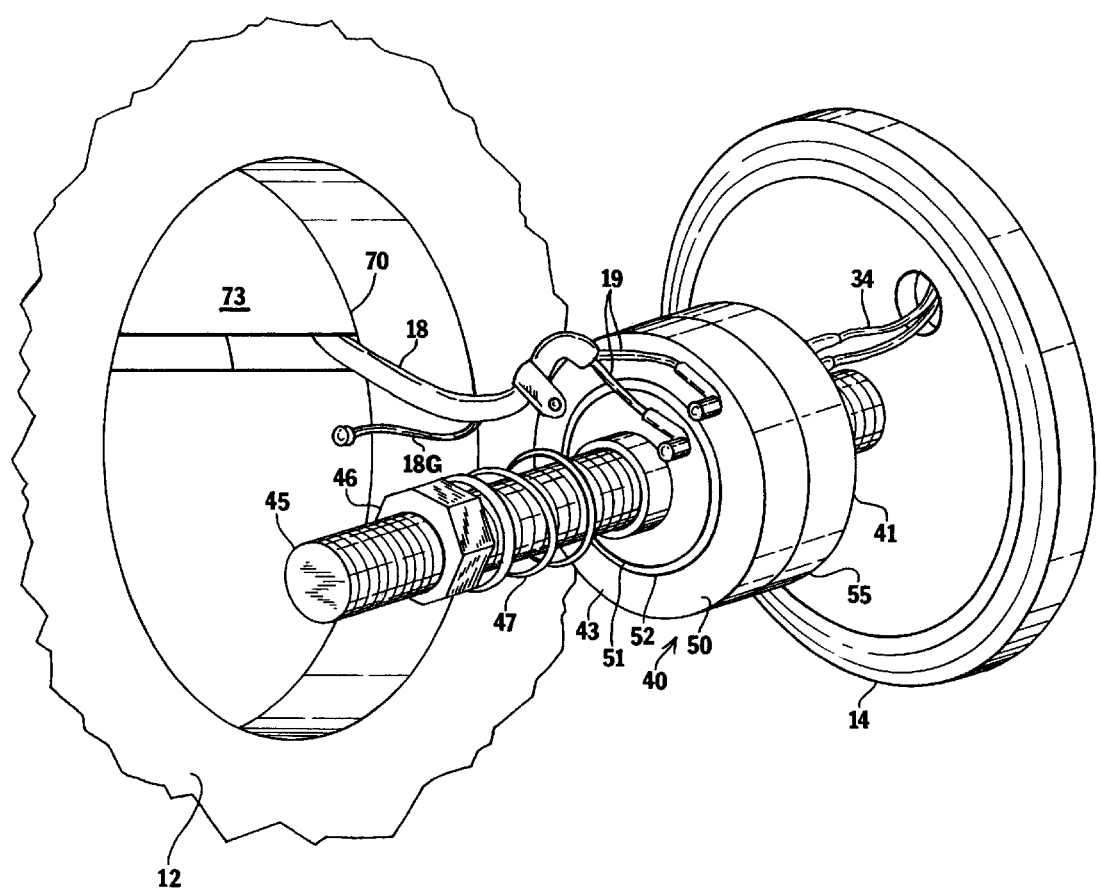
FIG. 2 is a diagrammatic perspective view, illustrating the slip ring assembly removed from the spool.

FIG. 2 illustrates a slip ring assembly 40 which is inside the spool 12. The slip ring assembly 40 has a stationary end 41 and a movable end 43. The stationary end 41 maintains a fixed relative position to the hub plate 14, and the movable end maintains a fixed relative position to the spool 12. The stationary end 41 and movable end 43 rotate around a main axis which is formed by a main shaft assembly 45.

The main shaft assembly 45 is rigidly fastened to the hub plate 14. The main shaft assembly 45 further has a spool fastening nut 46 for fastening the spool 12 onto the main shaft assembly 45. A coil spring 47 extends around the main shaft assembly 45 between the slip ring assembly 40 and the fastening nut 46. The spool 12 is fastened onto the main shaft assembly 45 between the fastening nut 46 and coil spring 47, to allow free rotation of the spool 12 upon the main shaft assembly 45. Preferably, a washer or bearing can be interposed between the coil spring 47 and the spool 12, to smooth the rotation of the spool 12 on the main shaft assembly 45.

The movable end 43 comprises an outer movable ring 50 and an inner movable ring 51. The outer movable ring 50 and inner movable ring 51 are separated by an intermediate insulating tube 52. The intermediate insulating tube 52 is slightly larger in diameter than the inner movable ring 51 and is slightly less in diameter than the outer movable ring 50. Thus, the intermediate tube 52 is tightly sandwiched between the outer movable ring 50 and inner movable ring 51.

Also visible in FIG. 2, the fixed end 41 of the slip ring assembly 40 has an outer fixed ring 55. The outer fixed ring 55 is identical to the outer movable ring 50 in size and maintains electrical connection therewith, despite opposite rotation therewith on the shaft assembly 45.

Figure 4:
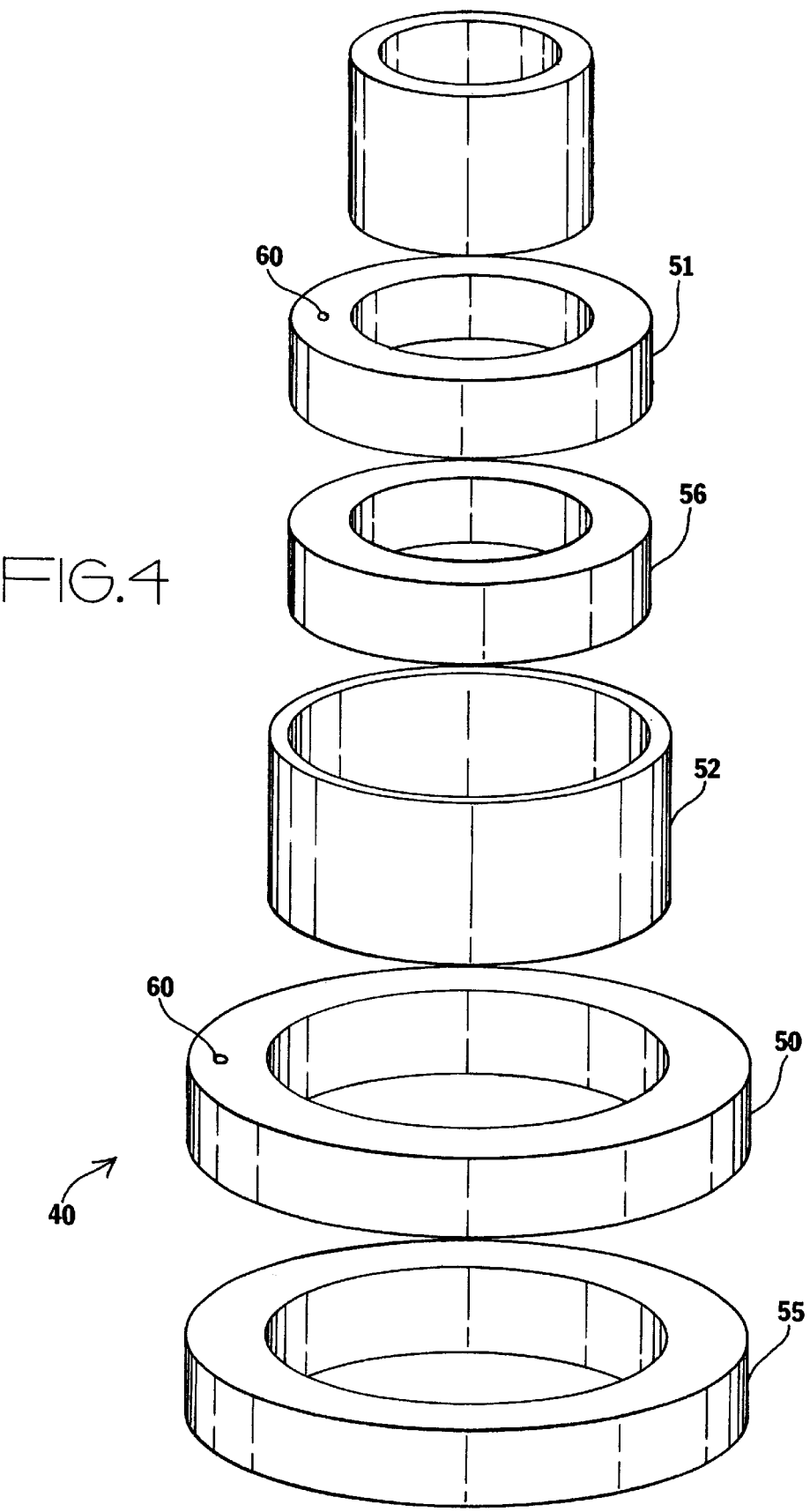
FIG. 4 is an assembly view, illustrating the major components of the slip ring assembly.

FIG. 4 details major components of the slip ring assembly 40. As illustrated, the outer fixed ring 55 and outer movable ring 50 are essentially identical in diameter. Further, an inner fixed ring 56 is identical to the inner movable ring 51. The intermediate insulating tube 52 extends between both outer rings and both inner rings. The intermediate insulating tube 52 electrically isolates both inner rings from both outer rings. In addition, a shaft insulating tube 57 is provided to insulate both the inner movable ring 51 and inner fixed ring 56 from the shaft assembly. Once assembled, both inner rings 51 and 56 are stacked upon each other, surrounded by the intermediate tube 52; and both outer rings 50 and 55 are stacked upon each other, and surround the intermediate tube 52.

Both the inner rings and outer rings have connection holes 60 for connecting to wires on the fixed end 41 and movable end 43 of the slip ring assembly 40. Referring back to FIG. 2, the extension cord 18 is attached to the movable end 41 of the slip ring assembly 40. Two conductors 19 from the extension cord 18 are separately electrically connected to the outer movable ring 50 and inner movable ring 51 in the connecting holes 60 therein. Additionally, the fixed cord 34 is attached to the fixed end 41 of the slip ring assembly. In this manner, the fixed cord 34 can stay in a fixed position with respect to the hub plate 14 and the extension cord 18 maintains a fixed position with respect to the spool 12, while the spool 12 rotates on the hub plate 14.

The main shaft assembly is metallic 45, so that it can serve as a third conductor, to communicate a ground connection between the extension cord and the fixed cord 34. Referring back to FIG. 1, a fixed cord ground 34G is attached to the stationary mounting 16, which is therefore metallic also, and provides electrical connection with the main shaft assembly 45.

Figure 3:
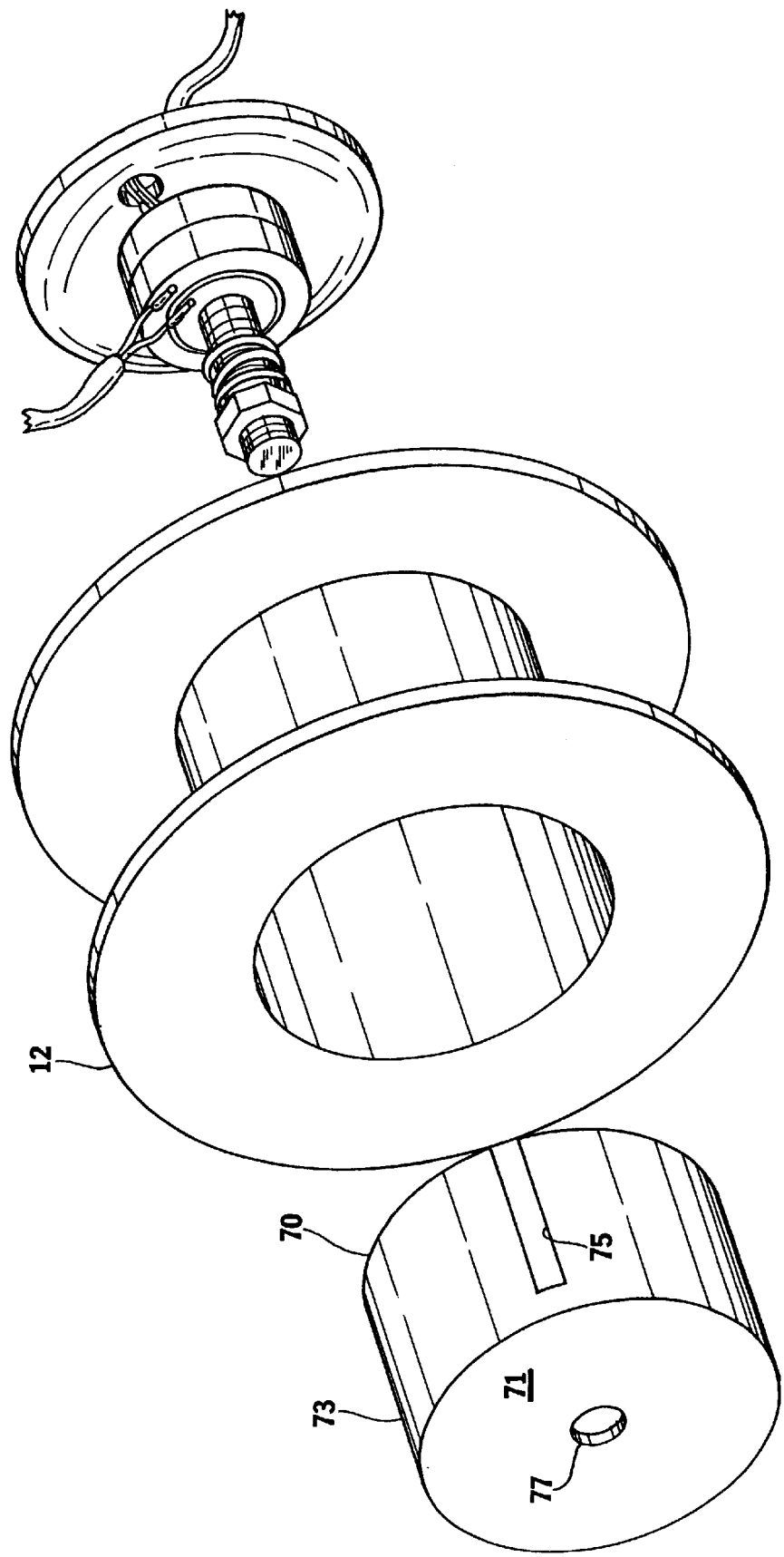
FIG. 3 is an assembly view, illustrating the reel, including the spool, the slip ring assembly, the spool insert and the hub plate components about to be assembled together.

Referring to FIG. 3, the spool 12 has a spool insert 70 which is cup shaped, having a round spool insert end 71 and a cylindrical portion 73. A slot 75 extends in the cylindrical portion 73 for allowing the extension cord 18 to extend therethrough. The spool insert 70 also has a shaft mounting hole 77 centered in the spool insert end 71 The spool insert 70 is metallic, for allowing an electrical connection therethrough.

Accordingly, referring back to FIG. 2, the extension cord has an extension cord ground 18G. The extension cord ground 18G is fastened to the cylindrical portion 73 of the spool insert 70, to create an electrical connection therewith. Further, once the main shaft assembly 45 is mounted in the shaft mounting hole 77 (not shown) in the spool insert 70, an ground connection is created between the extension cord 18 and the fixed cord 34.

To review, with reference generally to the drawing figures, the ground connection travels from the fixed cord ground 34G into the hub plate 14, through the main shaft assembly 45, to the spool insert 70 at the shaft mounting hole 77, and then finally to the extension cord ground 18G. Typically, the hub plate 14 and the spool insert 70 are painted, or otherwise covered with an insulating material, except at points of electrical connection just described.

Figure 5:
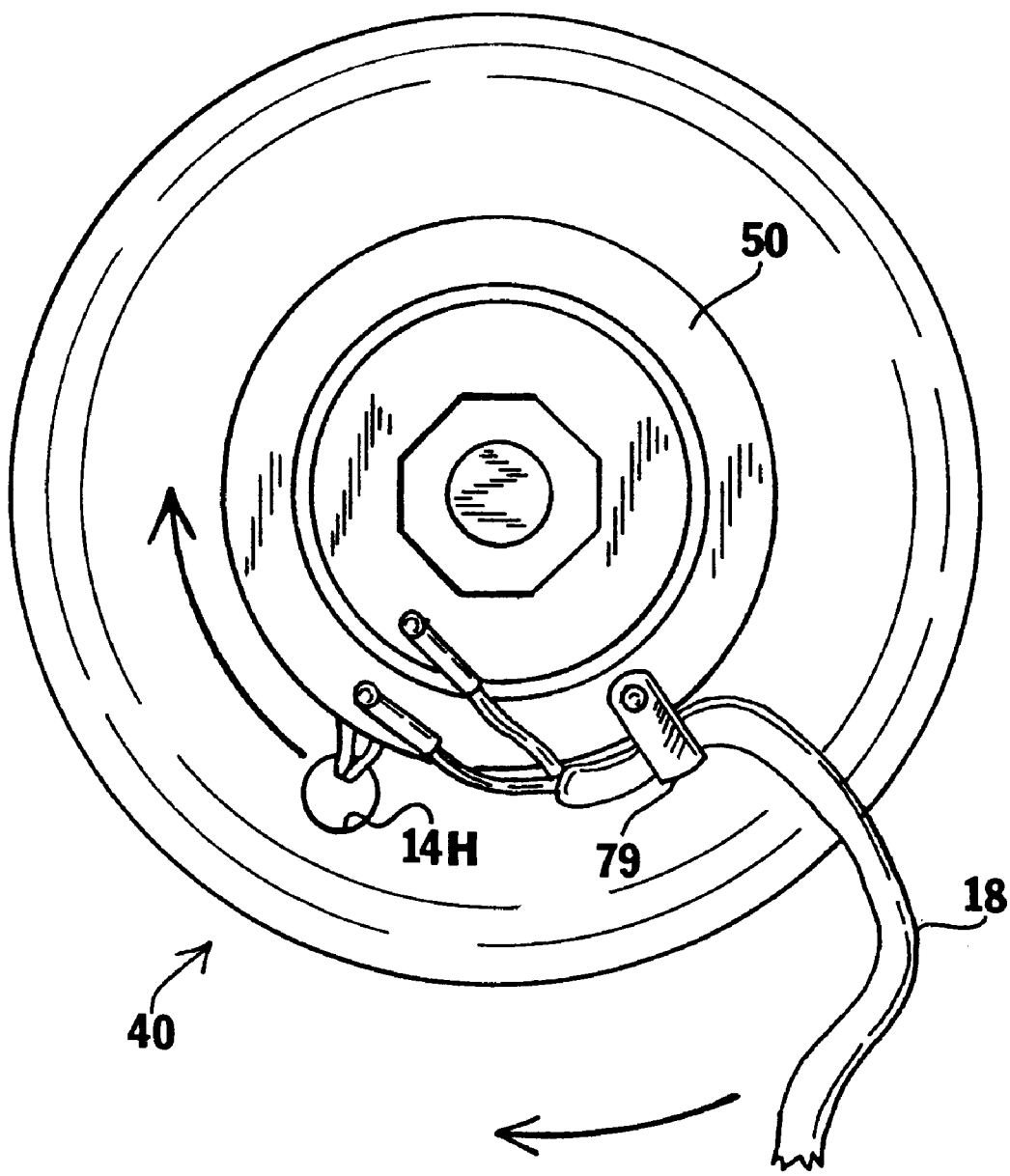
FIG. 5 is a side elevational view of just the slip ring assembly.

Referring to FIG. 5, the extension cord 18 is held fast to the slip ring assembly 40 with a strap 79 which is mounted directly to the movable outer ring 50. The strap 79 prevents the extension cord 18 from pulling against the connections between the extension cord 18 and slip ring assembly 40. Also illustrated, the hub plate 14 has a hub plate hole 14H, through which the fixed cord 34 extends.

In conclusion, herein is presented a wire reel which comprises a spool having a quantity of extension cord. A hub plate is mounted concentrically with the spool, has a fixed cord which is connected to a fixed power source, and is attached to a fixed mounting. A slip ring assembly allows the spool to be rotated with respect to the hub plate for reeling or unreeling the extension cord, while the fixed cord can remain physically attached to the fixed power source.

What is claimed is:

1. A wire reel, for providing power to a remote from a fixed power source, comprising:

a stationary mounting near the fixed power source;

a fixed power cord for attaching to the fixed power source;

a spool containing a quantity of extension cord wound thereon, the extension cord having a remote end;

a hub plate, the hub plate rigidly attached to the stationary mounting and allowing rotation of the spool thereupon, the fixed power cord attached to the hub plate; and a slip ring assembly, comprising a fixed end, a movable end, and an intermediate insulating tube, said assembly disposed between the hub plate and spool, the slip ring assembly providing a continuous electrical connection between the fixed power cord and the extension cord so that the spool can be rotated around the hub plate without physically disconnecting the fixed power cord from the fixed power source, while the electrical connection between the fixed power cord and the extension cord is maintained;

the movable end of the slip ring assembly comprising a movable outer ring and a movable inner ring which fits within the movable outer ring;

the fixed end of the slip ring assembly comprising a fixed outer ring having a same diameter as the movable outer ring, and a fixed inner ring having a same diameter as the movable inner ring, wherein the fixed inner ring fits within the fixed outer ring;

the intermediate insulating tube extending between both outer rings and both inner rings, to insulate the outer rings from the inner rings, the tube larger in diameter than the inner rings but smaller in diameter than the outer rings;

conductors from the fixed cord are separately attached to connection holes in the fixed outer ring and fixed inner ring, and wherein the conductors from the extension cord are separately attached to connection holes in the movable outer ring and movable inner ring;

a metallic main shaft assembly forming an axis of rotation for the spool wherein the spool is metallic and has a spool insert hole for mounting the main shaft assembly, and wherein a ground connection between the fixed cord and the extension cord is provided by the main shaft assembly and spool insert, the main shaft assembly extending through the slip ring assembly and rigidly attaching to the hub plate.

* * * * *